United States Patent [19]
Cheng et al.

[11] Patent Number: 5,655,103
[45] Date of Patent: Aug. 5, 1997

[54] SYSTEM AND METHOD FOR HANDLING STALE DATA IN A MULTIPROCESSOR SYSTEM

[75] Inventors: Kai Cheng; Kimming So; Jin Chin Wang, all of Austin, Tex.

[73] Assignee: International Business Machines Corporation, Armonk, N.Y.

[21] Appl. No.: 387,689

[22] Filed: Feb. 13, 1995

[51] Int. Cl.⁶ .................................................. G06F 12/14
[52] U.S. Cl. .......................... 395/479; 395/451; 395/4.72; 395/490
[58] Field of Search .................................. 395/451, 471, 395/472, 468, 479, 490, 474

[56] References Cited

U.S. PATENT DOCUMENTS

| | | | |
|---|---|---|---|
| 4,394,731 | 7/1983 | Flusche et al. | 395/472 |
| 4,484,267 | 11/1984 | Fletcher | 395/451 |
| 4,503,497 | 3/1985 | Krygowski et al. | 395/451 |
| 4,513,367 | 4/1985 | Chan et al. | 395/472 |
| 4,747,043 | 5/1988 | Rodman | 395/451 |
| 5,113,514 | 5/1992 | Albonesi et al. | 395/471 |
| 5,130,922 | 7/1992 | Liu | 395/471 |
| 5,185,871 | 2/1993 | Frey et al. | 395/375 |
| 5,210,848 | 5/1993 | Liu | 395/451 |
| 5,222,224 | 6/1993 | Flynn et al. | 395/471 |
| 5,230,070 | 7/1993 | Liu | 395/472 |
| 5,490,261 | 2/1996 | Bean et al. | 395/448 |
| 5,511,226 | 4/1996 | Zilka | 395/823 |

Primary Examiner—Eddie P. Chan
Assistant Examiner—Hong C. Kim
Attorney, Agent, or Firm—Robert M. Carwell; Jenkens & Gilchrist; Raymond M. Galasso

[57] ABSTRACT

A system and method for identifying which incoming write data is valid and for insuring that stale data does not overwrite valid data within system memory within a symmetrical multiprocessor data processing system. Upon receipt of a Load Miss request from a processor, a stale bit is established and set equal to zero. A determination is then made of which other processor has ownership of the requested cache line. The requested cache line is then transferred in a cache-to-cache transfer from the second processor to the first processor. If the first processor further modifies the cache line and writes back the cache line to system memory before the original owner of the cache line writes back the stale data with an acknowledgment of the cache-to-cache transfer, the stale bit is set to one. Upon receipt from the acknowledgment from the original owner of the cache line, the stale data is dropped when it is determined that the stale bit has been set.

12 Claims, 3 Drawing Sheets

FIG. 3

DEPENDENCY TABLE

| ADDRESS | INCLUSION BITS | | | CROSS INTERROGATION BITS | | | STALE BIT |
|---|---|---|---|---|---|---|---|
| ------ | 1 | 1 | 0 | 0 | 1 | 0 | 0 |
|  | CPU 101 | CPU 102 | CPU 103 | CPU 101 | CPU 102 | CPU 103 |  |

FIG. 4

| ------ | 0 | 1 | 0 | 0 | 1 | 0 | 0 |
|---|---|---|---|---|---|---|---|

FIG. 5

| ------ | 0 | 0 | 0 | 0 | 0 | 0 | 0 |
|---|---|---|---|---|---|---|---|

FIG. 6

| ------ | 1 | 0 | 0 | 0 | 0 | 0 | 0 |
|---|---|---|---|---|---|---|---|

FIG. 7

| ------ | 0 | 1 | 0 | 0 | 1 | 0 | 1 |
|---|---|---|---|---|---|---|---|

FIG. 8

| ------ | 0 | 0 | 0 | 0 | 0 | 0 | 1 |
|---|---|---|---|---|---|---|---|

SYSTEM AND METHOD FOR HANDLING STALE DATA IN A MULTIPROCESSOR SYSTEM

TECHNICAL FIELD OF THE INVENTION

The present invention relates in general to data processing systems, and in particular, to a system and method for detecting and handling stale write-back data within a multiprocessor data processing system.

BACKGROUND OF THE INVENTION

In a traditional symmetrical multiprocessor system ("SMP"), data coherency is maintained by a relatively time consuming but effective procedure. For example, if a requestor (e.g., central processing unit ("CPU"), input/output ("I/O")) within the system desires a particular portion of data (e.g., a cache line), it will first determine whether or not the requested data is located within its local cache. If the data is not in the cache, a Load Miss (or Read Miss) request is then sent to the memory controller, which controls system memory, requesting that the data be supplied to the CPU from system memory. Typically, the memory controller includes a directory that indicates whether or not the requested data is located within system memory, or whether a particular CPU within the SMP system currently has ownership of the most recent version of the requested data. If system memory contains the most recent version of the requested data, then the memory controller supplies that data to the requesting CPU. However, if the memory controller determines, through its directory, that a second CPU within the SMP system contains the most recent version of the requested data, then a cross-interrogation message is sent to the second CPU requesting that it return ownership of the most recent copy of the requested data to the memory controller so that the memory controller can then transfer ownership of that data portion to the originally requesting CPU. Upon receipt of the cross-interrogation message, the second CPU then writes back the data portion to the memory controller, which then transfers the data to the requesting CPU.

As can be readily seen, such a procedure involves numerous steps, each requiring several system cycles to perform.

In an enhanced directory-based SMP system (i.e., one which includes a facility to handle cache-to-cache transfers of data between CPUs), several of these steps, and their corresponding cycle times can be eliminated, resulting in a faster transfer of ownership of a requested data portion within an SMP system. In such a system, instead of the second CPU (which contains the exclusive (modified) copy of the requested data) returning the requested data to the memory controller, a cache-to-cache transfer of the data from the second CPU to the first CPU is performed. Upon receipt of the cache-to-cache transfer of the requested data, the first CPU returns an acknowledgement of the receipt to the second CPU. With such a protocol, several of the aforementioned steps can be eliminated.

There are two more steps that are performed independently by the two CPUs. First, the second CPU will return an acknowledgement to the memory controller of its cache-to-cache transfer to the first CPU. This acknowledgment may include a copy of the data in the same form as that transferred to the first CPU. Second, the first CPU, which has now acquired ownership of the requested data through the cache-to-cache transfer, may further modify the data and then perform a write-back to system memory.

A problem may occur since ownership of the data may be transferred back to system memory before the memory directory receives the acknowledgment from the second CPU. With such scenario, the memory controller cannot identify whether the incoming data is valid or not, and a stale copy of the data may be written back destroying a good copy within system memory. As a result, there is a need in the art for a technique that insures that the most recent valid copy of data that has been transferred from one CPU to another in a cache-to-cache transfer is eventually stored within system memory.

SUMMARY OF THE INVENTION

The afore-mentioned need is satisfied by the present invention. The present invention is preferably implemented within a symmetrical multiprocessing system including a plurality of CPUs, each having a local cache. The CPUs and the local caches are coupled to a memory controller through a cross-bar switch (interconnection network), although a bus may be utilized instead. The memory controller controls access to system memory, and further implements a system directory for tracking various transactions within the SMP system.

In a preferred embodiment of the present invention, upon receipt of a Load Miss request from a first CPU within the SMP system, the memory controller determines which of the other CPUs currently has ownership of the requested cache line, if system memory does not currently contain the most recent and valid version of the requested cache line. The memory controller stores an indicator of which CPU sent the Load Miss request, an indicator of who is the current owner of the requested cache line, and indicators of which CPUs can eventually write back the cache line. The memory controller also sets a stale bit to 0.

Next, the memory controller sends a cross-interrogation message to the second CPU, which the memory controller has determined has current ownership of the requested cache line. The second CPU receives the cross-interrogation message and determines that the copy of the requested cache line is in a Modified state. The second CPU then initiates a cache-to-cache transfer of the cache line to the first CPU, which has requested the cache line. The first CPU acknowledges to the second CPU that the cache line has been received.

When the memory controller receives an acknowledgment with a write back of the cache line, it will check the stale bit within its system directory. If the stale bit is set, the write back data will be dropped. Such a situation occurs when the first CPU modifies the cache line that it has received from the second CPU and subsequently issues a Cast Out (write back) of the cache line to system memory. The Cast Out is received by the memory controller, which then sets the stale bit. This prevents the system memory controller from replacing the valid data received from the first CPU with the previous version of the data previously owned by the second CPU before the transfer to the first CPU.

If, however, an acknowledgment is received from the second CPU that the cache line has been transferred to the first CPU previous to a receipt of a Cast Out from the first CPU, then the stale bit will not be set and the memory controller will then send the write back data received along with the acknowledgment from the second CPU to system memory.

In either case, once the acknowledgment is received from the second CPU, the entry established within the system directory for monitoring the afore-mentioned activities is removed.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 illustrates a detail of memory controller 107 showing a dependency table;

FIG. 4 illustrates a dependency table entry upon receipt of a Reset Inclusion from CPU 101;

FIG. 5 illustrates a dependency table entry upon receipt of an acknowledgment from CPU 102;

FIG. 6 illustrates a dependency table entry upon receipt of an acknowledgment from CPU 102 with write back data;

FIG. 7 illustrates a dependency table entry upon receipt of a Cast Out from CPU 101; and FIG. 8 illustrates a dependency table entry upon receipt of an acknowledgment from CPU 102 with write back data subsequent to receipt of a Cast Out from CPU 101.

DETAILED DESCRIPTION OF A PREFERRED EMBODIMENT OF THE INVENTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
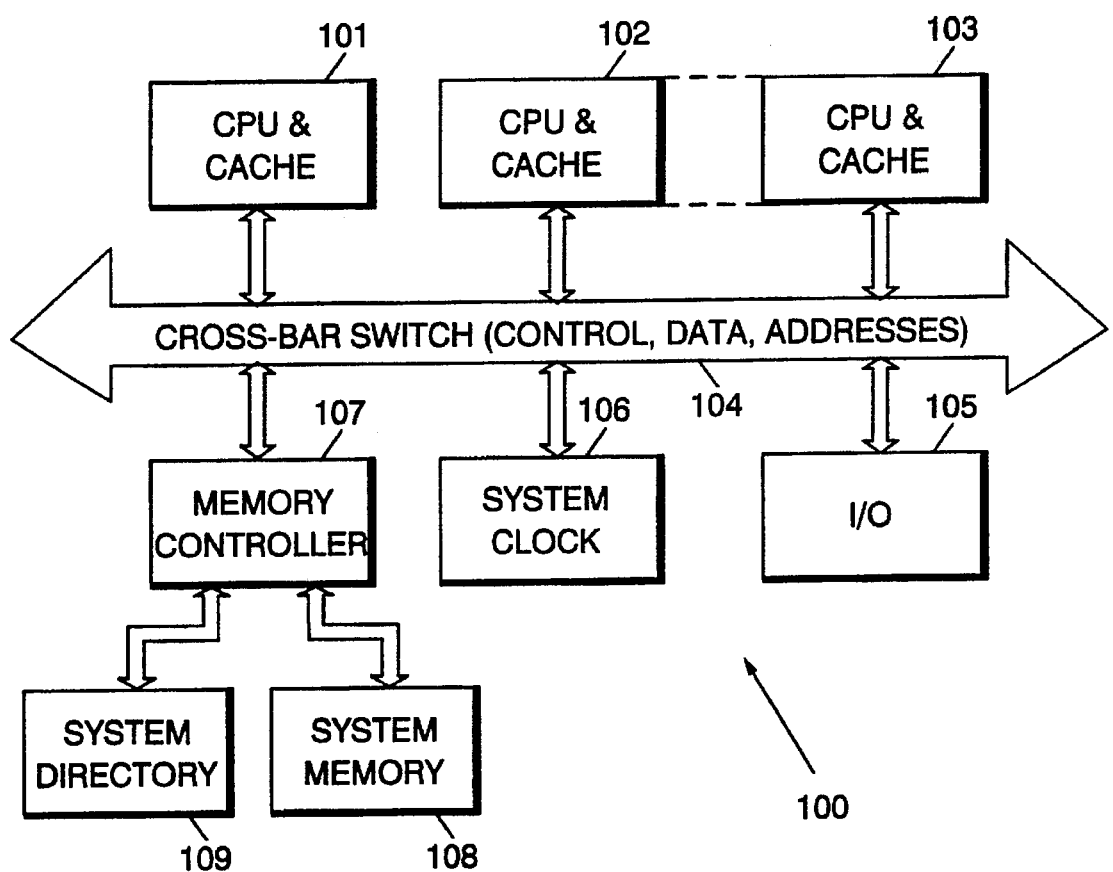
FIG. 1 illustrates an SMP system.

Referring to FIG. 1, there is illustrated SMP system 100, which contains a plurality (N; where N>1) of CPUs 101-103. Each of CPUs 101-103 also includes a local cache, such as a level 1 or a level 2 cache. CPUs 101-103 are coupled to cross-bar switch 104. Cross-bar switch 104 couples system 100 to system clock 106, which supplies clock signals to all of the components within system 100, and to I/O components 105. Memory controller 107 couples system memory 108 to cross-bar switch 104. Memory controller 107 is also coupled to system directory 109, which contains the ownership information of cache lines that reside in CPUs 101-103 and I/O 105.

For further discussions of an example of SMP system 100, please refer to the following patent applications:

EFFICIENT ADDRESS TRANSFER TECHNIQUE FOR A DATA PROCESSING SYSTEM, Ser. No. 08/317,007;

DUAL LATENCY STATUS AND COHERENCY REPORTING FOR A MULTIPROCESSING SYSTEM, Ser. No. 08/316,980;

SYSTEM AND METHOD FOR DETERMINING SOURCE OF DATA IN A SYSTEM WITH INTERVENING CACHES, Ser. No. 08/317,256;

QUEUED ARBITRATION MECHANISM FOR DATA PROCESSING SYSTEM, Ser. No. 08/317,006;

METHOD AND APPARATUS FOR REMOTE RETRY IN A DATA PROCESSING SYSTEM, Ser. No. 08/316,978;

ARRAY CLOCKING METHOD AND APPARATUS FOR INPUT/OUTPUT SUBSYSTEMS, Ser. No. 08/316,976;

DATA PROCESSING SYSTEM HAVING DEMAND BASED WRITE THROUGH CACHE WITH ENFORCED ORDERING, Ser. No. 08/316,979;

COHERENCY AND SYNCHRONIZATION MECHANISMS FOR I/O CHANNEL CONTROLLERS IN A DATA PROCESSING SYSTEM, Ser. No. 08/316,977;

ALTERNATING DATA VALID CONTROL SIGNALS FOR HIGH PERFORMANCE DATA TRANSFER, Ser. No. 08/326,190;

LOW LATENCY ERROR REPORTING FOR HIGH PERFORMANCE BUS, Ser. No. 08/326,203.

The following is an example of an instance where the present invention is not utilized and stale data is written into system memory 108 subsequent to a cache-to-cache transfer of a requested cache line from one CPU to another:

At time $t_0$: CPU 102 owns a copy of cache line X in its local cache, wherein the state of cache line X is in a modified state (i.e., CPU 102 has modified the cache line subsequent to receiving ownership of cache line X from system memory 108, CPU 101, CPU 103, or I/O 105).

At time $t_1$: CPU 101 issues a Load Miss to memory controller 107 for cache line X (e.g., CPU 101 issues a Read Miss to address X).

At time $t_2$: The Load Miss arrives at memory controller 107, which is the home directory of the address X. After memory controller 107 reads its directory 109, it determines that CPU 102 has the ownership of the requested cache line that contains the address X. Memory controller 107 then sends a cross-interrogation message to CPU 102 to serve the Load Miss request.

At time $t_3$: CPU 102 receives the cross-interrogation and discovers that the copy of the requested cache line X is in a Modified state. CPU 102 then initiates a cache-to-cache transfer to send the cache line X and the ownership of the cache line X to CPU 101.

At time $t_4$: CPU 101 receives a copy and ownership of the cache line X, which contains the address X. An error correction code ("ECC") checker validates the ECC status and determines that the data is valid. CPU 101 issues an acknowledgment to CPU 102 of the data received.

At time $t_5$: CPU 101 issues a STORE to the address X and modifies its cache and sets the modified bit in its cache directory (e.g., CPU 101 further modifies the cache line X).

At time $t_6$: CPU 101 issues a Cast Out (write-back) of the cache line X, which contains address X, sending it to memory controller 107.

At time $t_7$: the Cast Out request arrives at memory controller 107. An ECC checker validates the ECC status and determines that the data is valid. Memory controller 107 then initiates an acknowledgment to CPU 101.

At time $t_8$: memory controller 107 reads its dependency table and verifies that CPU 101 has the right to Cast Out the cache line X. Memory controller 107 then processes the Cast Out request and writes the data into system memory 108 (which is preferably a dynamic random access memory ("DRAM")).

At time $t_9$: due to a switch delay between CPU 101 and CPU 102, the acknowledgment issued by CPU 101 at $t_4$ arrives at CPU 102. CPU 102 then generates a write-back acknowledgment to memory controller 107. However, the write-back cache line X is a stale copy of the cache line X, since the latest modified copy is already in system memory 108 at time 18. Since CPU 101 modified the cache line X, the data within system memory 108 is not coherent.

Referring to FIG. 3, there is illustrated memory controller 107, which is implemented with a dependency table. The dependency table is shown with a dependency table entry that is created upon receipt of a Load Miss request, in this case a Load Miss request from CPU 101. As will be discussed below with respect to FIG. 2, the dependency table entry includes the address of the requested cache line, and inclusion bits indicating which of CPUs 101-103 (I/O 105 also) sent the Load Miss request, and who is the current owner of the cache line, and to whom a cross-interrogation bit has been sent. In FIG. 3, the dependency table entry indicates that CPUs 101 and 102 may write back the requested data, since a bit has been set for CPU 101, since CPU 101 sent the Load Miss request, and a bit has been set for CPU 102, since CPU 102 is the current owner of the requested cache line. There is also a bit set for CPU 102 since a cross-interrogation has been sent to CPU 102.

The present invention also implements a bit, referred to as the stale bit, in every entry in the dependency table. In other words, for any cross-interrogation acknowledgment with write-back data, memory controller 107 first looks to the stale bit before it makes a decision whether or not to write the received data into system memory 108 or to drop the data.

The inclusion bits ensure that only designated CPUs will be allowed to write back the particular cache line to system memory 108.

The stale bit and the inclusion bits in the dependency table are maintained as follows:

When an entry is created in the dependency table, its stale bit is set to "0" and both inclusion bits for the two CPUs are set to "1s" (see FIG. 3).

When a CPU, which owns a copy of the cache line, sends a Reset Inclusion (a deallocate directory tag) to memory controller 107, its inclusion bit in the dependency bit is reset and there is no change to the stale bit (see FIG. 4).

When a CPU, which owns a copy of the cache line, sends a Cast Out request to memory controller 107, its inclusion bit in the dependency table is reset and the stale bit is set (see FIG. 7).

When memory controller 107 receives an acknowledgment with write-back data, it will check the stale bit in its dependency table. If the stale bit is set, the write-back data will be dropped (see FIG. 8); otherwise, the write-back data will be sent to memory controller 107 to update system memory with the write-back data (see FIGS. 5 and 6). After the decision is made, the entry in the dependency table is removed, since the cross-interrogation is now completed.

Figure 2:
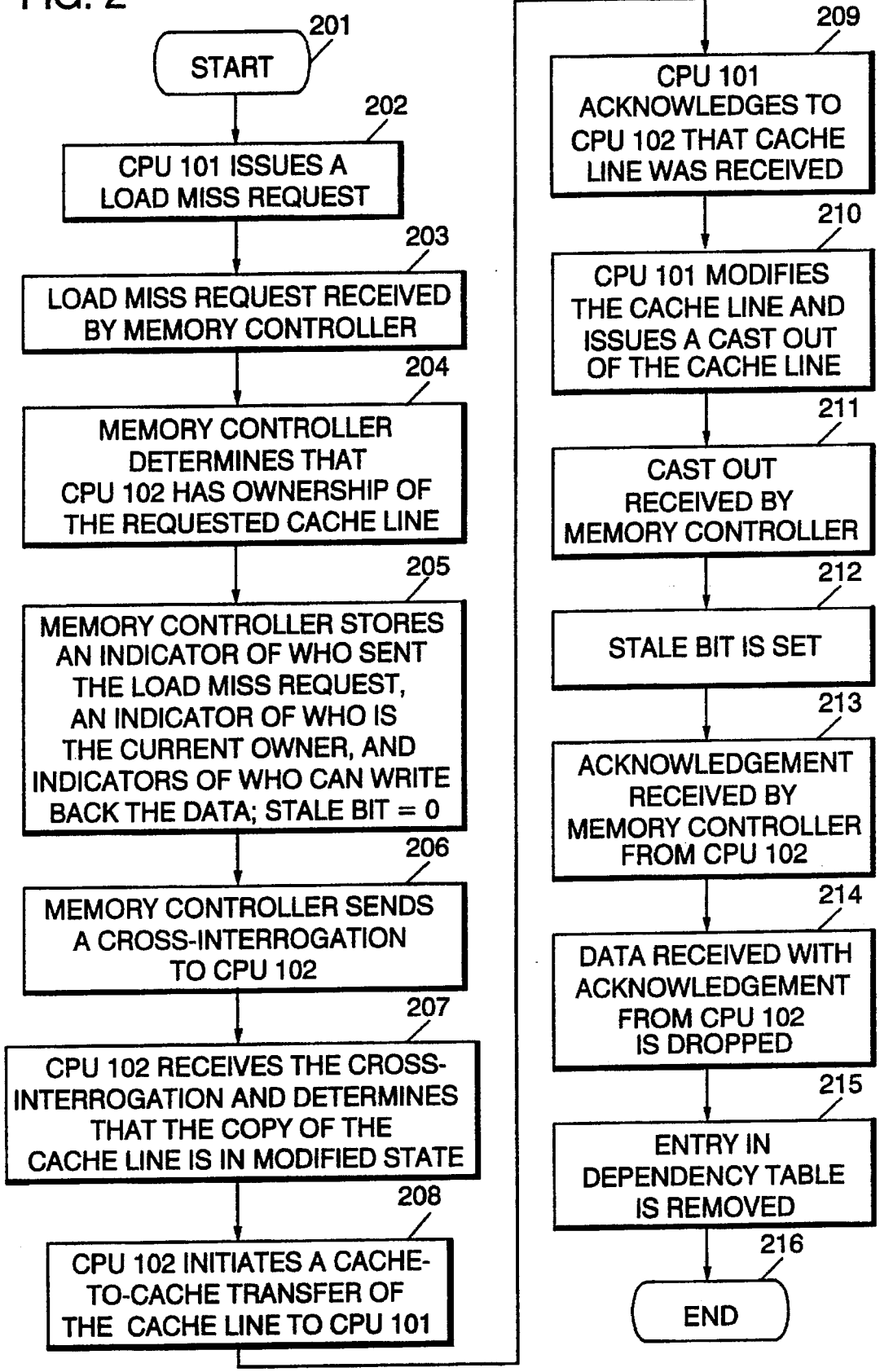
FIG. 2 illustrates a flow diagram of a preferred embodiment of the present invention.

Referring next to FIG. 2, there is illustrated a flow diagram of a preferred embodiment of the present invention. The protocol represented by this flow diagram is implemented within system 100. The process starts at step 201 and proceeds to step 202 where CPU 101 issues a Load Miss request. Such a request will be issued when CPU 101 desires a particular cache line from system memory 108. In step 203, the Load Miss request is received by memory controller 107. In step 204, memory controller 107 determines whether or not system memory 108 has ownership of the requested cache line (i.e., whether or not system memory 108 contains the most recent version of the requested cache line). If memory controller 107 determines that system memory 108 does not have ownership of the requested cache line, memory controller 107 then determines which of the other CPUs (or I/O 105) within system 100 has ownership of the requested cache line. In this example, memory controller 107 determines that CPU 102 has ownership of the requested cache line.

In step 205, memory controller 107 sets up a table entry within its dependency table based on the ownership information retrieved from system directory 109, which stores an indicator that CPU 101 sent the Load Miss request, an indicator that CPU 102 has ownership of the requested cache line, and sets the stale bit equal to zero (see FIG. 3). The indicators of CPU 101 and 102 are also referred to as the inclusion bits, since they indicate that only CPUs 101 and 102 are included within the group of devices that will be allowed to write-back the cache line to system memory 108.

Thereafter, in step 206, memory controller 107 sends a cross-interrogation message to CPU 102 indicating that CPU 101 requests the cache line. In step 207, CPU 102 receives the cross-interrogation message and determines that the copy of the cache line in CPU 102 is in a Modified state. In step 208, CPU 102 then initiates a cache-to-cache transfer of the requested cache line and ownership of the requested cache line to CPU 101. In step 209, CPU 101 acknowledges to CPU 102 that the cache line has been received. Subsequent to receipt of the acknowledgment from CPU 101 to CPU 102, CPU 102 may at any time return an acknowledgment to memory controller 107 of a complete and successful transfer of the cache line from CPU 102 to CPU 101. However, either acknowledgment may not be issued immediately. Such an instance may occur when CPU 101 or 102 is required, or requested, to perform various other functions within system 100. For example, such an instance may occur due to (1) a queuing delay in cross-bar switch 104 between CPU 101 and CPU 102, or (2) a queuing delay inside CPU 102, or (3) a queuing delay in cross-bar switch 104 between CPU 102 and memory controller 107.

Upon receipt of the cache-to-cache transfer of the cache line and the corresponding ownership, CPU 101, within step 210, may then modify the cache line. CPU 101 may then desire to store the modified cache line in system memory 108 and will issue a Cast Out, or write-back, of the modified cache line to memory controller 107. In step 211, this Cast Out is received by memory controller 107. Upon receipt of the Cast Out, memory controller 107 resets the corresponding inclusion bit in its dependency table and also sets the stale bit (see FIG. 7).

In step 213, an acknowledgment of the cache-to-cache transfer is received from CPU 102 by memory controller 107. Since the stale bit has been set (see FIG. 8), the data received along with the acknowledgment from CPU 102 is dropped, since this data is now stale in view of the modifications to the cache line performed by CPU 101 subsequent to the cache-to-cache transfer from CPU 102 to CPU 101.

In step 215, the established entry within the dependency table in system directory 109 is then removed, including the inclusion bits and the stale bit. The process then ends at step 216.

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, memory hierarchy, cache coherency, and administrative facilities.

Although the present invention and its advantages have been described in detail, it should be understood that various changes, substitutions and alterations can be made herein without departing from the spirit and scope of the invention as defined by the appended claims.

What is claimed is:

1. A multiprocessor system comprising first and second processors coupled to each other and to a memory and associated memory controller, said system comprising:

means for transferring a request for data from said first processor to said memory and associated memory controller;

means for determining that said second processor owns said requested data;

means for transferring ownership of said requested data from said second processor to said first processor;

said first processor including means for modifying said requested data transferred from said second processor to said first processor;

means for casting out said requested data modified by said means for modifying from said first processor to said memory and associated memory controller;

means for indicating receipt by said memory and associated memory controller of said requested data modified by said means for modifying and east out from said first processor;

said second processor including means for sending, to said memory and associated memory controller, a second processor acknowledgment of said transfer of ownership of said requested data from said second processor to said first processor, said second processor acknowledgment accompanied by a copy of said data without said modifications performed by said first processor;

means for storing within said memory said copy of said data without said modifications performed by said first processor when said second processor acknowledgment from said second processor of said transfer of ownership of said requested data from said second processor to said first processor is received by said memory controller prior to receipt of said means for indicating by said memory controller of said requested data modified by said means for modifying from said first processor to said memory and associated memory controller;

means for not storing within said memory said copy of said data without said modifications performed by said first processor when said second processor sends said second processor acknowledgment in response to said indication of receipt by said memory and associated memory controller of said requested data modified by said means for modifying and cast out from said first processor; and means for dropping entries in a table including said means for indicating maintained by said memory controller upon receipt by said memory and associated memory controller of said second processor acknowledgment, sent by said second processor, of said transfer of ownership of said requested data from said second processor to said first processor, said second processor acknowledgment accompanied by a copy of said data without said modifications performed by said first processor.

2. The system as recited in claim 1, further comprising:

means in said memory controller for storing an indication that said first processor sent said request for said data; and means in said memory controller for storing an indication that said second processor owns said requested data.

3. The system as recited in claim 2, wherein said means for indicating receipt by said memory and associated memory controller of said requested data modified by said means for modifying and cast out from said first processor, said means in said memory controller for storing an indication that said first processor sent said request for said data, and said means in said memory controller for storing an indication that said second processor owns said requested data are stored as said entries in said table maintained by said memory controller.

4. The system as recited in claim 1, wherein said requested data is in a modified state in said second processor.

5. The system as recited in claim 1, further comprising:

means for transferring from said first processor to said second processor a first processor acknowledgment of receipt of ownership of said requested data.

6. The system as recited in claim 5, wherein transfer from said second processor to said memory and associated memory controller of said second processor acknowledgment of said transfer of ownership of said requested data from said second processor to said first processor is performed in response to said transfer from said first processor to said second processor of said first processor acknowledgment of receipt of ownership of said requested data.

7. The system as recited in claim 1, wherein said first processor is associated with an input/output means coupled to said memory and said associated memory controller.

8. The system as recited in claim 1, wherein said data is embodied within a cache line, and wherein said transfer of ownership of said requested cache line from said second processor to said first processor is a cache-to-cache transfer.

9. A method for preventing stale data from being stored in system memory within a multiprocessor computer system including first and second processors coupled to said system memory which has a memory controller associated therewith, said method comprising the steps of:

transferring a read request for data from said first processor to said memory and associated memory controller;

determining that said second processor owns said requested data in a modified form;

transferring ownership of said requested data from said second processor to said first processor;

modifying, by said first processor, said requested data transferred from said second processor to said first processor;

casting out said requested data modified in said modifying step from said first processor to said memory and associated memory controller;

indicating receipt by said memory and associated memory controller of said requested data modified in said modifying step and cast out from said first processor in said casting out step;

sending a second processor acknowledgment of said transfer of ownership of said requested data from said second processor to said first processor, from said second processor to said memory and associated memory controller, said second processor acknowledgment accompanied by a copy of said data without said modifications performed by said first processor;

storing within said memory said copy of said data without said modifications performed by said first processor when said second processor acknowledgment from said second processor of said transfer of ownership of said requested data from said second processor to said first processor is received by said memory controller prior to receipt in said indicating step by said memory controller of said requested data modified in said modifying step from said first processor to said memory and associated memory controller;

not storing within said memory said copy of said data without said modifications performed by said first processor when said second processor acknowledgment from said second processor of said transfer of ownership of said requested data from said second processor to said first processor is received by said memory controller subsequent to receipt in said indicating step by said memory controller of said requested data modified in said modifying step from said first processor to said memory and associated memory controller; and dropping entries in a table from said indicating step upon receipt by said memory and associated memory controller of said second processor acknowledgment, sent by said second processor, of said transfer of ownership of said requested data from said second processor to said first processor wherein said second processor acknowledgment is accompanied by a copy of said data without said modifications performed by said first processor.

10. The method as recited in claim 9, further comprising the steps of:

storing an indication that said first processor sent said request for said data; and storing an indication that said second processor owns said requested data.

11. The method as recited in claim 9, further comprising the steps of:

transferring from said first processor to said second processor a first processor acknowledgment of receipt of ownership of said requested data.

12. The method as recited in claim 11, wherein transfer from said second processor to said memory and associated memory controller of said second processor acknowledgment of said transfer of ownership of said requested data from said second processor to said first processor is performed in response to said transfer from said first processor to said second processor of said first processor acknowledgment of receipt of ownership of said requested data.

* * * * *

UNITED STATES PATENT AND TRADEMARK OFFICE
CERTIFICATE OF CORRECTION

PATENT NO. :   5,655,103

DATED      :   August 5, 1997

INVENTOR(S) :

KAI CHENG et al

It is certified that error appears in the above-indentified patent and that said Letters Patent is hereby corrected as shown below:

Column 7, Line 36           Delete "east"
                                 Replace with --cast--

Signed and Sealed this

Second Day of December, 1997

*Attest:*

BRUCE LEHMAN

*Attesting Officer*          Commissioner of Patents and Trademarks